United States Patent [19]

Kumada et al.

[11] Patent Number: 5,008,581
[45] Date of Patent: Apr. 16, 1991

[54] PIEZOELECTRIC REVOLVING RESONATOR AND SINGLE-PHASE ULTRASONIC MOTOR

[75] Inventors: Akio Kumada, Kokubunji; Takahiko Iochi, Koganei; Minoru Okada, Kunitachi, all of Japan

[73] Assignees: Hitachi Maxell, Ltd., Osaka; Demix Technology Inc., Tokyo, both of Japan

[21] Appl. No.: 335,374

[22] Filed: Apr. 10, 1989

[30] Foreign Application Priority Data

Apr. 12, 1988 [JP] Japan .................................. 63-88160

[51] Int. Cl.⁵ ............................................. H01L 41/08
[52] U.S. Cl. ..................................... 310/323; 310/357; 310/358; 310/366; 310/369
[58] Field of Search ............... 310/323, 325, 328, 333, 310/359, 365, 316, 317, 369

[56] References Cited

U.S. PATENT DOCUMENTS

| | | | |
|---|---|---|---|
| 4,019,073 | 4/1987 | Vishnevsky et al. | 310/359 X |
| 4,633,204 | 12/1986 | Gounji et al. | 310/359 X |
| 4,779,019 | 10/1988 | Onishi et al. | 310/359 X |
| 4,868,446 | 9/1989 | Kumada | 310/323 |
| 4,893,045 | 1/1990 | Konda | 310/323 |
| 4,893,047 | 1/1990 | Honda | 310/323 |
| 4,894,578 | 1/1990 | Honda | 310/323 |

FOREIGN PATENT DOCUMENTS

| | | | |
|---|---|---|---|
| 0245483 | 12/1985 | Japan | 310/323 |
| 63-181676 | 7/1988 | Japan . | |
| 63-181677 | 7/1988 | Japan . | |
| 63-181678 | 7/1988 | Japan . | |

Primary Examiner—Mark O. Budd
Attorney, Agent, or Firm—Birch, Stewart, Kolasch & Birch

[57] ABSTRACT

A piezoelectric revolving resonator is disclosed in which a piezoelectric ceramic material in the form of a disk, a cylinder or a pipe is polarized so that two regions divided by its diameter are different in polarity from each other, and electrodes are provided to form equipotential surfaces on opposite principal surfaces and a resonant condition in which piezoelectric deformations are revolved is excited by a single-phase alternating current voltage. Due to the single-phase drive, the structures of the resonator and the drive circuit can be simplified.

6 Claims, 6 Drawing Sheets 5,008,581

PIEZOELECTRIC REVOLVING RESONATOR AND SINGLE-PHASE ULTRASONIC MOTOR

BACKGROUND OF THE INVENTION

1. Field of the Invention

The present invention relates to an ultrasonic piezoelectric revolving resonator in which a piezoelectric deformation is revolved under the first order resonating mode where a gravitational center of a piezoelectric disk, annulus or cylinder, or cylindrical pipe is revolved and an ultrasonic motor using the piezoelectric revolving resonator, and more particularly to the improvement of an excitation mechanism therefor.

2. Prior Art Discussion

In a conventional piezoelectric revolving resonator and a motor using the resonator, in particular in an ultrasonic revolving resonator (Japanese Patent Application No. 62-11373 (Laid-Open No. 63-181676(A)) and a gravity revolving type ultrasonic motor (Japanese Patent Application No. 52-11374 (Laid-Open No. 63-181677(A))), both proposed by one of the present inventors, it is necessary to drive the components by using an electric source having two or more outputs different in phase. Also, for instance in a four-polar quadrapole piezoelectric revolving resonator disclosed in Japanese Patent Application 62-11375 (Laid-Open No. 63-181678(A)), entitled "FOUR-POLAR ULTRASONIC REVOLVING RESONATOR", four regions divided over a disc, annulus or cylinder, or cylindrical pipe along a circumference thereof have to be driven by four phase voltages different in phase by $\pi/2$.

Accordingly, in such an arrangement the drive circuit is complicated and the number of wirings is increased. Therefore it was difficult to reduce the electric source in size and to decrease the cost. These disadvantages could be eliminated by simplifying the four-phase drive to a two-phase drive in accordance with a method for polarizing the adjacent regions of the four regions in opposite polarities. However, in comparison with the single phase drive, this was complicated, and it was difficult to manufacture the piezoelectric revolving resonator in which the torques of the adjacent poles were balanced.

SUMMARY OF THE INVENTION

Accordingly, in order to overcome the disadvantages such as difficulty in the driving method inherent in the prior art, an object of the present invention is to provide a piezoelectric revolving resonator that is capable of a single-phase drive and a single-phase ultrasonic motor using the resonator.

When vibration of a disk made of elastic material is excited in its proper vibration frequency, the disk is resonated under the resonant condition. Although the excitation frequency is a proper or eigen value depending upon the shape, material, temperature or the like of the disk, it is not necessarily limited to a single value. A sequence of numbers in the form of a geometrical progression with a constant ratio with respect to a certain proper value is established by the eigen values or proper values. The lowest frequency is referred to as a basic frequency, and the frequencies other than the basic frequency are referred to as higher harmonic frequencies or harmonics.

The mode of oscillation or vibration of the disk resonated at the basic frequency is referred to as "aspiration" motion in which the circle of the disk is uniformly expanded or contracted. This is also called "zero-th order mode" (see FIG. 4A). The first order mode at the next higher harmonic mode where the gravity center of the disk is moved is shown in FIG. 4B. The second order mode is an elliptic mode as shown in FIG. 4C. In FIGS. 4A to 4C, numeral 31 denotes a piezoelectric ceramic plate, each of numerals 32, 35 and 40 denote a gravitational center, and each of numerals 33, 34, 38 and 39 denotes deformation of the disk.

Among these higher frequency modes, the odd number order modes were thought to be related to the movement of the gravity center. However, it is thought that only the even number order modes of vibration could be excited in the piezoelectric disk vibrator or oscillator. The understanding above is based on the following assumption. If the resonant condition would appear in the odd number order, positive and negative electric charges would simultaneously be induced on the same electrode on each of the principal faces of the disk, which would be unreasonable. Thus, it has been concluded that the eXcitation was impossible in the odd number mode in the piezoelectric disk oscillator, which had been an established theory.

However, this established theory has been reversed by the prior application entitled "Gravity Center Revolving Resonator" by the present applicants. More specifically, electrodes on the principal faces of the piezoelectric disk 31 are equally divided into two parts along a diameter to form a dielectric band 45 therebetween whereby four independent electrodes 41, 42, 43 and 44 are formed on top and bottom faces of the disk. Alternating voltages are applied to the disk, as shown in FIG. 5B, so that the opposed pair of electrodes disposed on the top and bottom faces among the four electrodes 41, ..., 44 are opposite in polarity, and simultaneously the two on the same face are opposite in polarity. This method of vibration is called antisymmetric excitation.

According to this antisymmetric exciting method, the generated resonant mode is only in the odd number order, and the minimum order mode used as a basic mode is of the gravitational center movement type, as shown in FIG. 4B. Next, these four (two pair) of half-disk shape electrodes were equally divided to form four pair of eight quarter disk-shape electrodes. When a four phase voltage was applied to each pair of electrodes, vibrations different in phase by $\pi/2$ were excited and they caused the gravitational center of the disk revolute. This is the four pole four phase piezoelectric revolving resonator. Here to utilize a piezoelectric disk which was prepared in advance to be poled by the application of opposite polar voltages to the pair of half disk-shape electrodes, makes possible the two phase excitation. These facts had been presented in the prior art. Now, the present single phase excitation method has been discovered, wherein a polar piezoelectric disk having opposite polarities in each half disk was excited by a single-phase voltage applied to the two whole major faces in the manner of making a uniform electric field, applied through equipotential major faces. A rotor having 6 mm in diameter contacted to the periphery of the disk was rotated and the measured results are shown in FIG. 13.

Four petal shape patterns 91 indicate the obtained magnitude of rotation numbers and the arrows 92 indicate the rotating direction of rotor shaft. These arrows show the rotation of the rotor shaft becomes reverse in direction at each quater-disk portion. Namely, it is possible to excite, in the piezoelectric revolving resonator, a mode of revolving the piezoelectric deformation by the single phase alternating voltages.

In a motor using a piezoelectric revolving resonator of the single-phase excitation of revolution, it is impossible to change its revolution direction only by an electrical signal as in the single-phase electric motor. This was overcome by the prior application entitled "GRAVITY REVOLVING TYPE ULTRASONIC MOTOR" (Japanese Patent Application Laid-Open No. 63-181677) in which four-phase rotary electric fields having a phase relationship different in phase by 90 degrees relative to each other sequentially are applied to four electrodes so as to simply switch over the direction of revolution to thereby revolve the rotor in the opposite revolution direction.

However, in the use or application where the reverse revolution is not required, such as in a watch motor, a record motor, a drill tool motor, and an accumulation motor, in which only one revolution mode is required, the multi-phase alternating electric source is disadvantageous because it requires a plurality of output circuits, complicated structures and high cost in comparison with a single-phase drive system. Accordingly, there is provided in accordance with the present invention a piezoelectric revolving resonator, the present invention that may be eXcited by a single phase excitation system and a single-phase ultrasonic motor using the resonator.

BRIEF EXPLANATION OF THE DRAWINGS

The foregoing and other objects, features, and advantages of the present invention will be made clearer from the following more particular description of preferred embodiments referring to the accompanying drawings, in which:

FIGS. 1A, 1B and 1C are views for illustrating a piezoelectric revolving resonator in accordance with an embodiment of the invention wherein FIG. 1A is a plan view for showing an intermediate step of producing the piezoelectric revolving resonator and FIGS. 1B and 1C are a plan view and a side elevational view, respectively, of the produced piezoelectric revolving resonator;

DETAILED DESCRIPTION OF THE PREFERRED EMBODIMENTS

The present invention will now be explained with reference to the accompanying drawings.

Figure 1A:
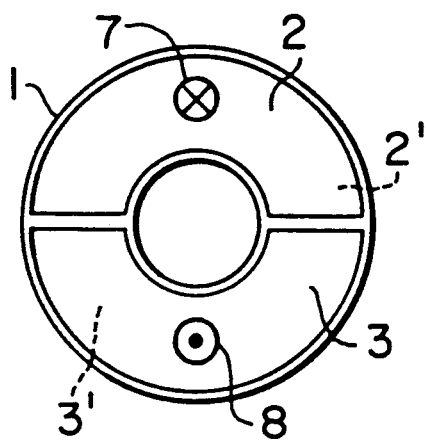
Figure 1B:
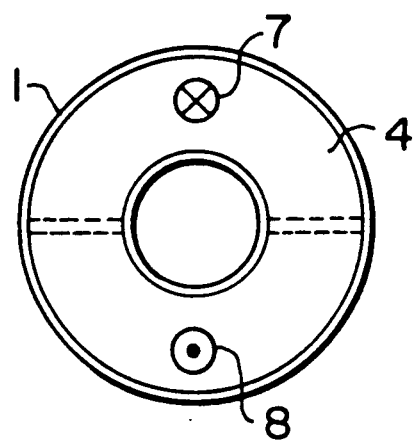
Figure 1C:
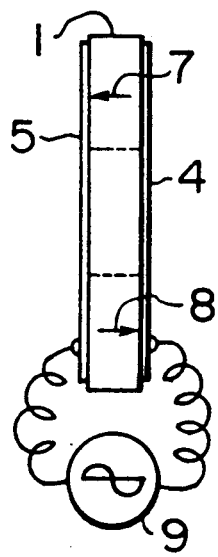

FIGS. 1A, 1B and 1C are views showing a piezoelectric revolving resonator according to an embodiment of the invention. FIG. 1A is a plan view showing the condition in the midway of manufacture of the resonator and FIGS. 1B and 1C are a plan view and a side elevational view of the resonator upon the completion of the manufacture thereof.

On opposite principal or primary surfaces of a disk 1 with a hole, having an outer diameter 40 mm, an inner diameter (hole diameter) 15 mm and a thickness 2 mm and made of piezoelectric ceramic of $Pb(Zr-Ti)O_3$ system, there was mask-printed a silver paste in the form of half-circles in accordance with a screen printing method. The paste was dried and heated at 750° C. for 10 minutes. Then, the disk was provided with four silver electrodes 2, 2', 3, and 3'. A high DC voltage of 4,000 volts was applied to two lead wires connected between the top electrode 2 and the bottom electrode 3 and between the top electrode 2' and the bottom electrode 3 to perform the polarizing process. This process was performed within a dielectric oil heated at a high temperature so that the polarizations 7 and 8 were formed in accordance with the direction of the applied electric fields.

The dielectric grooves between the electrodes 2, 3 and 2', 3' of the thus polarized disk 1 were coated with silver paste to form equi-potential surfaces. As a result, the electrodes 4 and 5 were formed substantially over the opposite primary surfaces of the disk 1, as shown in FIGS. 1B and 1C. An alternating current power supply 9 was connected to the two entire surface electrodes 4 and 5. A sinusoidal wave-like voltage having a peak-to-peak value of 10 volts was applied thereto and its frequency was swept. The disk was resonated at a frequency of 44.01 KHz and was strongly revolved. Its revolution could be observed by a microscope having a magnification ratio of 1,000 or more.

An output of the AC power supply whose frequency was adjusted in advance to a resonance frequency was set at zero and the disk was visually observed in a condition where a sharp microscope image was formed by focusing the microscope onto one point in a peripheral portion of the disk. Under such a condition, as the output voltage was increased, the image would be vignetted, and meanwhile a number of small circles appear in the visual field. Each of the small circles had the same size and is grown in accordance with the magnitude of the voltage. When the voltage of about $10_{p\text{-}p}$ volts was applied, clear circles could be observed. This is referred to as the state of the piezoelectric revolving resonation. Even if the observer's finger lightly touches the peripheral portion of the disk, the revolving condition is remarkably affected. When the peripheral portion of the resonator is lightly rubbed, the revolution torque may be felt through the finger. When the output of the power supply is set at zero, the feeling is like ceramic. When the output of the power supply is increased, the feeling is changed to an unusual feeling, slippery like an eel or snake. This is the revolving torque. If a rotary shaft was brought into contact with the peripheral portion of the disk, the shaft would be actively rotated.

Figure 3A:
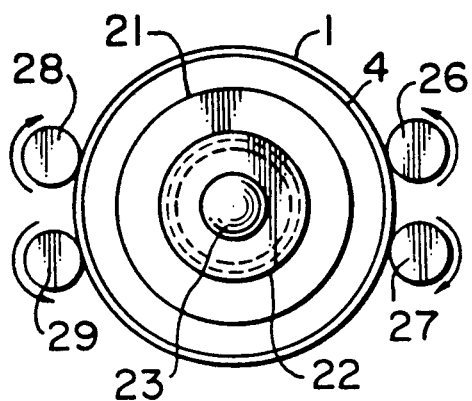
Figs. 3A and 3B are a plan view and a side elevational view, respectively, showing the condition where a contact type revolution number measuring apparatus is brought into contact with the piezoelectric revolving resonator.
Figure 3B:
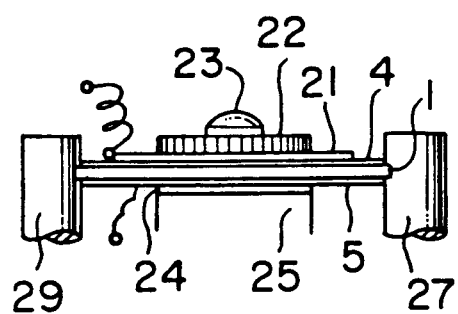
Figure 4A:
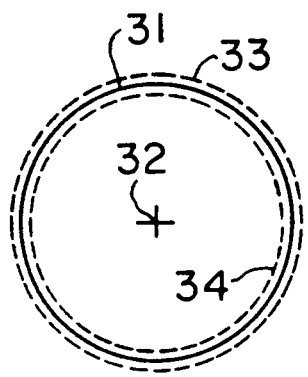
FIGS. 4A, 4B and 4C are views showing a deformed condition of the piezoelectric revolving resonator.
Figure 4B:
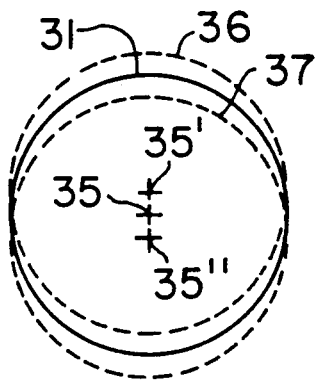
Figure 4C:
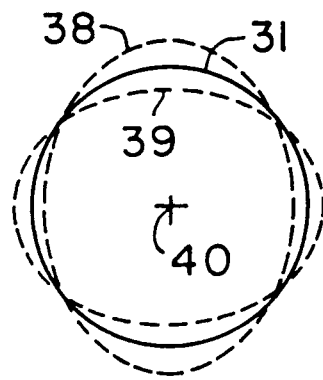
Figure 5A:
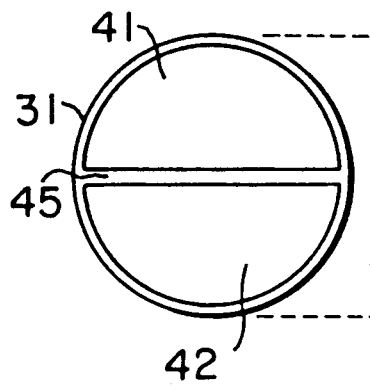
FIGS. 5A and 5B are views for illustrating a principle of the piezoelectric resonator.
Figure 5B:
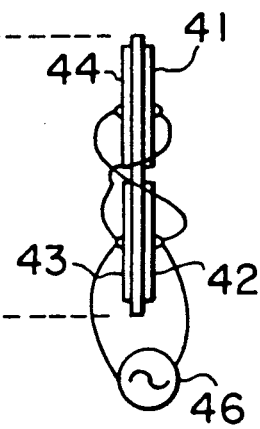

As shown in FIGS. 3A and 3B, in order to measure the revolution speed, a head shaft 26 of a contact type rotary revolution speed measuring instrument was physically circumscribed with the disk 1. Terminal plates 21 and 24 were disposed on the electrodes 4 and 5 of the piezoelectric ceramic disk 1. A holder fixed to the hole of the disk 1 was fastened by bolt 23 of a support 25 by means of a fastening nut 22. The sinusoidal wave single phase AC power supply was connected to the terminal plates 21 and 24. When the output of the power supply was set at 10 V, while the head 26 of the contact type revolution speed measuring instrument was being brought into contact with the circumferential periphery of the disk 1, the revolution speed was approximately 750 rpm. Subsequently, when the contact position of the head 26 was changed, it was found that the strong revolution was measured at the positions 27, 28 and 29. However, the revolution direction at the positions 27 and 28 was clockwise while the revolution direction at the positions 26 and 29 was counterclockwise as indicated by the arrows in FIG. 3A. Namely, the revolution direction of the load shaft may be reversed by changing the contact position between the shaft and the disk 1.

Figure 2A:
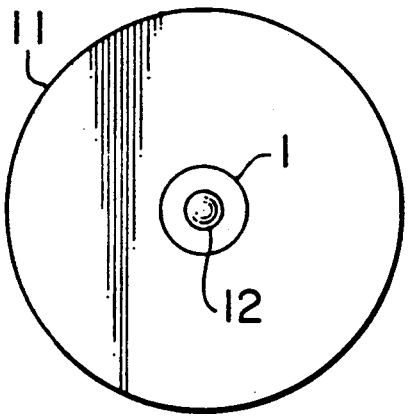
Figs. 2A and 2B are a plan view and a side elevational view, respectively, showing a single-phase ultrasonic motor using the piezoelectric revolving resonator.
Figure 2B:
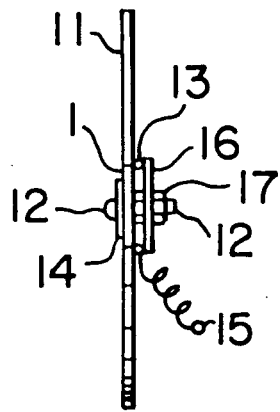

FIGS. 2A and 2B show an embodiment of a motor having the piezoelectric revolving resonator in accordance with the foregoing embodiment. FIG. 2A is a plan view thereof and FIG. 2B is a side elevational view thereof. The piezoelectric revolving resonator made of piezoelectric ceramic is an element itself as described in conjunction with the foregoing embodiment. Therefore, the duplicated explanation therefor will be omitted.

A cap bolt 12 provided with a dielectric rubber bush and having a diameter of 8 mm was passed through the center hole of the disk 1. The surface electrode 4 and the bolt 12 were short-circuited through a terminal plate 14. Subsequently, a glass plate having an output diameter of 200 mm and a thickness of 2 mm and having a center hole (40.05 mm in diameter) was engaged with the disk 1 along an outer circumference thereof. An annular thin plate 13 which was made of polyimide and had an outer diameter of 41 mm, an inner diameter of 39 mm and a thickness of 0.2 mm was adhered around the inner center hole of the glass plate 11. A retaining disk 16 which was also made of polyimide and had an outer diameter of 41 mm, an inner diameter of 15 mm and a thickness of 2 mm was disposed on the annular thin plate 13. The disk 16 was fastened by a nut 17. Thus, a spring provided with a lead wire 15 and attached to one face of the polyimide disk 16 was brought into contact with the electrode 5 of the piezoelectric revolving resonator.

The center hole of the polyimide disk 16 was fastened by the nut 17 under the condition the disk 16 was fitted around a rubber bush. The rubber bush was widened against the center hole and serves to prevent relative rotational displacement. Since the annular thin plate 13 adhered to the inner surface of the glass plate 11 and the disk 16 were set so as to contact with each other at a slight pressure, when the glass plate 11 was rotated, the glass plate 11 was prevented from being displaced away from the disk 1 and moving in a serpentine manner.

Under this condition, the bolt 12 was screwed into a screw hole formed in a wall so that the glass plate 11 was held vertically and simultaneously therewith, the electrode 4 being connected to a ground terminal of the wall through the bolt 12. When a rectangular wave voltage of 6 $V_{p-p}$ at a frequency of 44 KHz was applied to the lead wire 15, the glass plate 11 was smoothly rotated at about 60 rpm. It was thus possible to verify the capability of the function of an extremely thin type motor having the glass plate 11 as a rotor. Since the single-phase ultrasonic motor could be operated at a low voltage even if it was applied to a clock using an ultrasonic motor, it was found possible to use an LSI circuit made of C-MOS elements and the like. It was also verified that the circuit structure might be advantageously simplified because of the single phase.

Figure 6A:
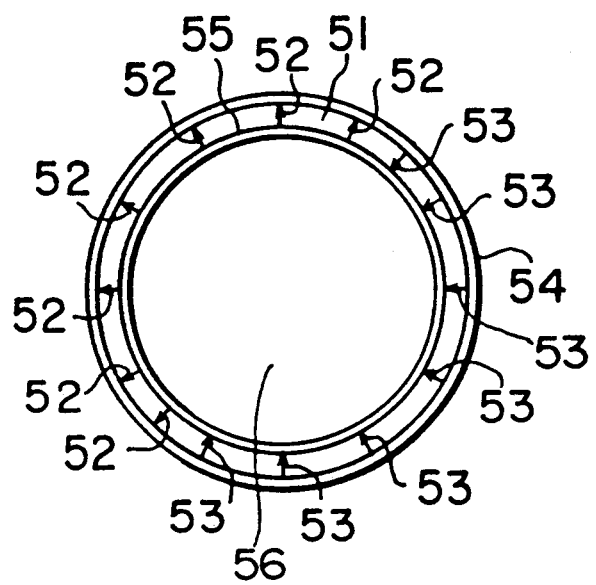
FIGS. 6A and 6B are a plan view and a side elevational view, respectively, showing another embodiment of a single-phase ultrasonic motor.
Figure 6B:
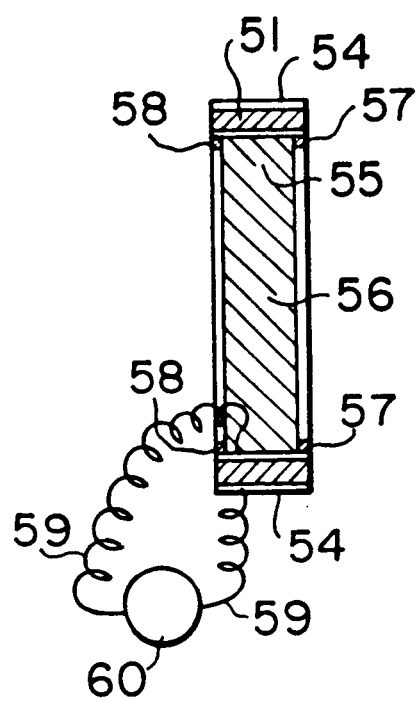

FIGS. 6A and 6B show a piezoelectric revolving resonator according to another embodiment of the invention in which this resonator is used in a single-phase ultrasonic motor.

A cylindrical pipe 51 which was made of Pb(Zr, Ti)O$_3$ piezoelectric ceramic and had an outer diameter of 40 mm, an inner diameter of 38 mm and a height of 10 mm was prepared and was subjected to a process in which the silver electrodes were backed and the ceramic pipe 51 was polarized in the same manner as in the foregoing embodiment. The direction of polarization was radial with respect to the pipe 51, that is, in the thickness direction. The polarizing directions of the semicylindrical pipes defined by dividing the pipe in the longitudinal direction were opposite to each other and were indicated by arrows 52 and 53.

Silver electrodes 54 and 55 were formed over almost all areas of the outer and inner circumferential surfaces of the pipe 51, respectively. Outer electrode 54 divided corresponding to the two semicylindrical pipe portions were, after the polarization step, short-circuited to form an equipotential surface in the same manner as in the foregoing embodiment. A piezoelectric revolving resonator having a true circle with an inner diameter 39.99±0.01 mm was produced by polishing the inner electrode 55 like a mirror.

A glass disk 56 having an outer diameter of 39.95±0.01 mm and a thickness of 8 mm was inserted into the inner hole of the pipe 51. The glass disk 56 was fixed so that it was sandwiched by annular copper rings 57 and 58 with a wire diameter of 0.5 mm and an outer diameter of 40 mm from the outside.

Under this condition, lead wires 59 connected to the electrodes 54 and 55 were connected to a rectangular wave single-phase power supply 60 at a frequency of 36.6 KHz. When 0.6 V dry battery (electric cell) was set, the glass plate 56 was actively rotated at about 30 rpm. The glass plate 56 was brought into contact with a face of the pipe 51 at its lowermost portion so that the glass plate 56 was subjected to a rotational torque through the friction. Two motors thus formed were prepared, so that the glass plates 56 of the two motors were used to define a minute hand and an hour hand of a clock. These glass disks 56 were set so as to overlap on one another and the motors were controlled to indicate the present time with the hour and minute hands, whereby it was possible to realize the function of the see-through or transparent clock shown in FIGS. 8A and 8B to be explained later in detail.

Figure 7:
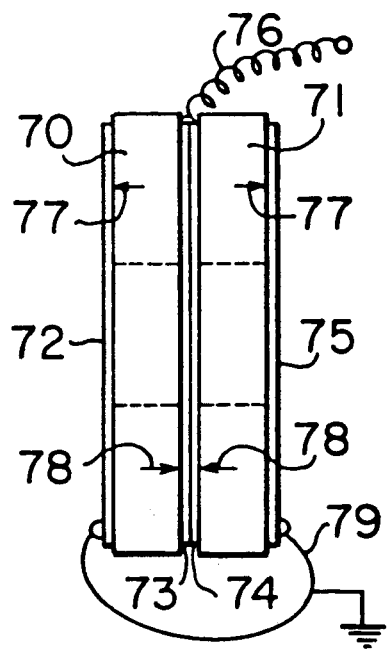
FIG. 7 is a side elevational view showing a piezoelectric revolving resonator in accordance with still another embodiment of the invention.

FIG. 7 shows a side elevational view showing a piezoelectric revolving resonator in accordance with a still another embodiment of the invention.

Two piezoelectric revolving resonators 70 and 71, each of which was made in the same manner as in the piezoelectric revolving resonator shown in FIG. 1, were overlapped with each other so that respective polarization directions 77 and 78 are opposite to each other. As a result, the electrodes 73 and 74 were electrically short-circuited to form an equipotential surface. A lead wire 76 was connected to the electrodes. The outer electrodes 72 and 75 were kept at the ground level by connecting them through lead wires 7g. The outer sides of the piezoelectric resonators 70, 71 were covered by the ground electrodes and the inner electrodes were insulated. This arrangement might be applied to the motor. In this case, even if the motor was brought into contact with a metallic case, there is no fear of short-circuiting. In addition, there is no fear of an electric shock when the user's hand was brought into contact with the resonators. It is therefore easy to handle. Furthermore, the power of the motor can be doubled advantageously.

Figure 8A:
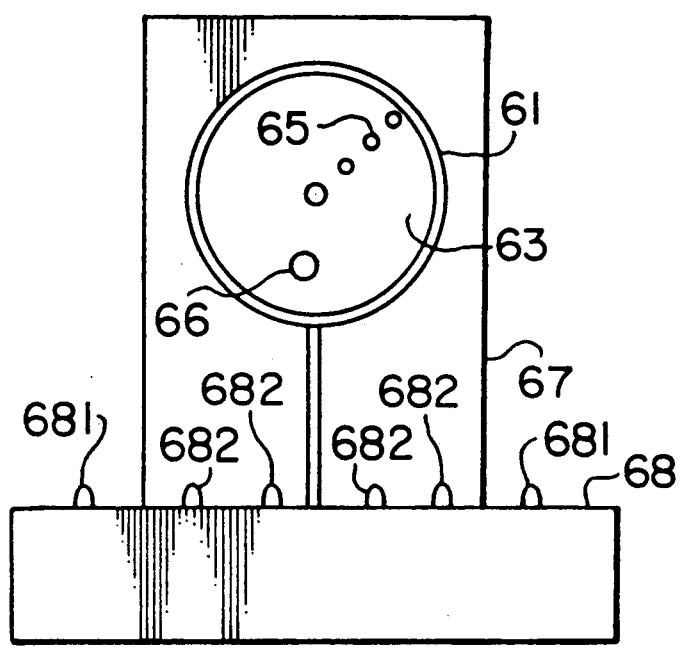
FIGS. 8A and 8B are a plan view and a side view, respectively; of a see-through clock using a single phase cylinder motor, in accordance with still another embodiment of the present invention.
Figure 8B:
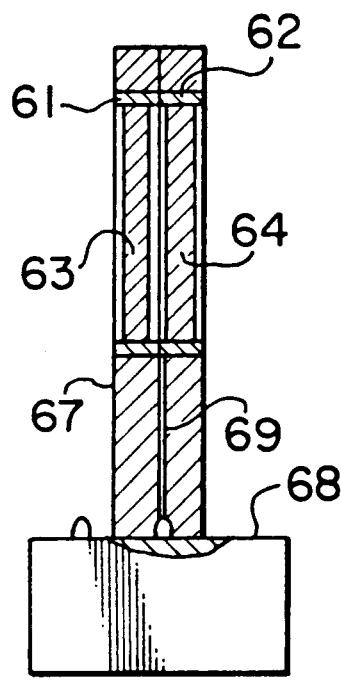

FIGS. 8A and 8B are a frontal view and a side elevational view showing a see-through clock using a single-phase cylinder motor according to a preferred embodiment of the invention.

Two through holes each having a diameter of 40.1 mm were formed in glass blocks each having a width of 60 mm, a height of 90 mm and a thickness of 10 mm. Two single-phase cylinder type piezoelectric revolving resonators 61 and 62 each having a diameter of 40 mm, an inner diameter of 38 mm and a height (thickness) of 6 mm were fitted, respectively, in the holes of the glass blocks. Glass flanges, each having an outer diameter of 39.5 mm and a thickness of 0.2 mm which were attached on glass plates each having an outer diameter of 37.95 mm and a thickness of 2 mm to form a minute hand disk 63 and an hour hand disk 64 including colored crystal stones were fitted in the holes of the resonators 61, 62. Sixty contacts (not shown) were formed between the confronted surfaces of the outer circumferential portions of the motor and the flanges of the hour and minute hand disks. Three fixing springs (each having a width of 0.3 mm, a length of 5 mm and a thickness of 0.05 mm, not shown) which would contact with the contacts were equiangularly provided on the contact circumference at an interval of 120 degrees and were provided with a lead wire 69 having a wire diameter of 0.07 mm to be connected to a control circuit. The control circuit was composed of a circuit board, incorporated in a base 68, including a 6 V battery, quartz oscillator, and a microcomputer and the time set by turning on switches 682 while lighting LEDs 681. The time setting for the minute or long hand disk and the hour or short hand disk were performed by switches 682 independently of each other. Since the clock may be operated in the same principle as that of the ultrasonic motor clock, and the detailed explanation is omitted. However, in the prior Japanese Application, the two-phase disk motor was used, whereas according to the present invention, the single-phase motor was used. In a table clock, it is unnecessary to reverse the hands, and it is possible to use a single-phase motor. In addition, the contacts between the long and short hand disks 63 and 64 used as rotors and the stators 61 and 62 are of the linear contact type on one location of the circumferences, where the bottoms of the stators and rotors are brought into contact with each other. In addition, the direction and magnitude of the rotational torque are stable. Thus, the use of the single-phase motor is ensured. The single-phase motor is economical in comparison with the two-phase motor because the single-phase motor needs only a half drive circuit for operation. Moreover, according to the embodiment, since a cylinder pipe motor is used, it is possible to provide a completely see-through clock and to design the clock for a high class one. The clock will be a future clock in which mechanical gears and bearings may be dispensed with. The clock may be operated by ICs and may have a long service life. According to this clock, it is possible to set the time for the foreign time standards as well as the present time standard (home time) by switching the switches 682 with ease. In this case, since the long hand disk is kept intact while only the short hand disk is rotated, it is possible to immediately indicate the time for the second standard. In a few seconds, the time indication is to be returned back to the home time indication. During the indication of the second time standard, the right side LED 681 is lit.

Figure 9:
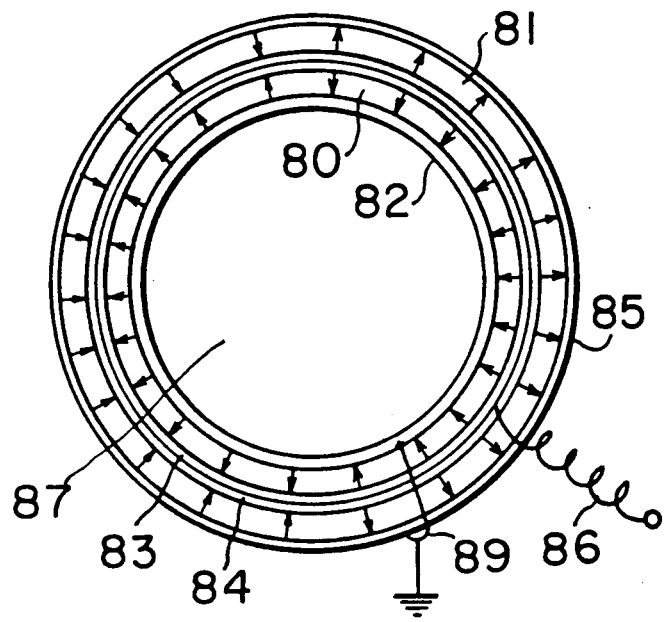
FIG. 9 is a plan view showing a piezoelectric revolving resonator in accordance with still another embodiment of the present invention.

FIG. 9 is a plan view showing a piezoelectric revolving resonator in accordance with a still another embodiment of the invention.

The embodiment relates to a double cylindrical pipe type piezoelectric revolving resonator, including piezoelectric ceramics 80, 81 in which rotors 87 used as a cylindrical pipe motor are inscribed with the inner electrode 82 to apply a rotational torque. In this case, since the metal case is grounded even if the metal case is brought into contact with an outer electrode 85 through connection 89, the metal case is held at the equipotential level with the rotor side. It is, therefore, possible to eliminate an accident of short-circuit. Of course, this is also the case in the motor in which a rotor is brought into contact with the outer electrode 85. Numerals 83, 84 denote electrodes electrically connected with each other.

Figure 10A:
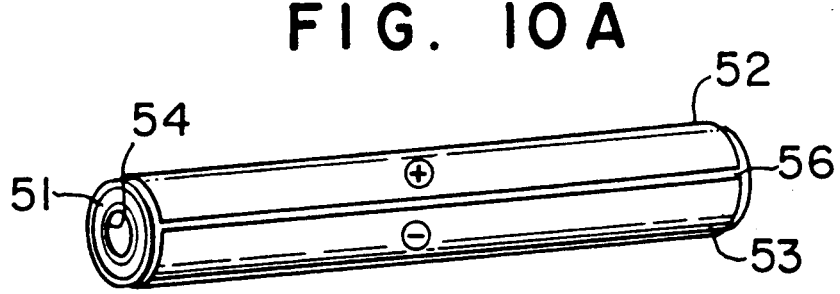
Figs. 10A and 10B are views showing a singlephase pipe type piezoelectric revolving resonator in accordance with still another embodiment the present invention.
Figure 10B:
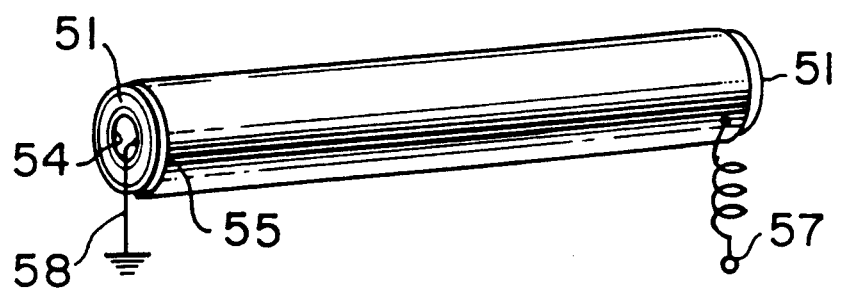

FIGS. 10A and 10B are views showing a single-phase pipe type piezoelectric revolving resonator in accordance with a still another embodiment of the invention. In FIGS. 10A and 10B, reference numeral 51 denotes a piezoelectric ceramic, numerals 52 and 53 denote outer peripheral divided electrodes, numeral 54 denotes an inner peripheral entire electrode, numeral 55 denotes an outer peripheral entire electrode, numeral 56 denotes a dielectric or insulative separator band, and numerals 57 and 58 denote lead wires.

Fig. 10A illustrate the polarized condition. Positive and negative DC voltages were applied to the outer peripheral divided electrodes 52 and 53 relative to the inner peripheral entire electrode 54, so that the directions of polarizations were opposite to each other by half the circumference.

FIG. 10B illustrates a polarized single-phase pipe type piezoelectric revolving resonator. After the polarizing treatment, an electrode was applied to the insulative separator band 56 of the outer peripheral electrodes to thereby keep the entire outer surface at an equipotential level to thereby provide single-phase pipe type piezoelectric revolving resonator. The lead wires 57 and 58 were attached to the resonator, and a single-phase AC voltage having a optional frequency was applied to the resonator to attain the resonant condition to form a piezoelectric revolving resonator.

Figure 11:
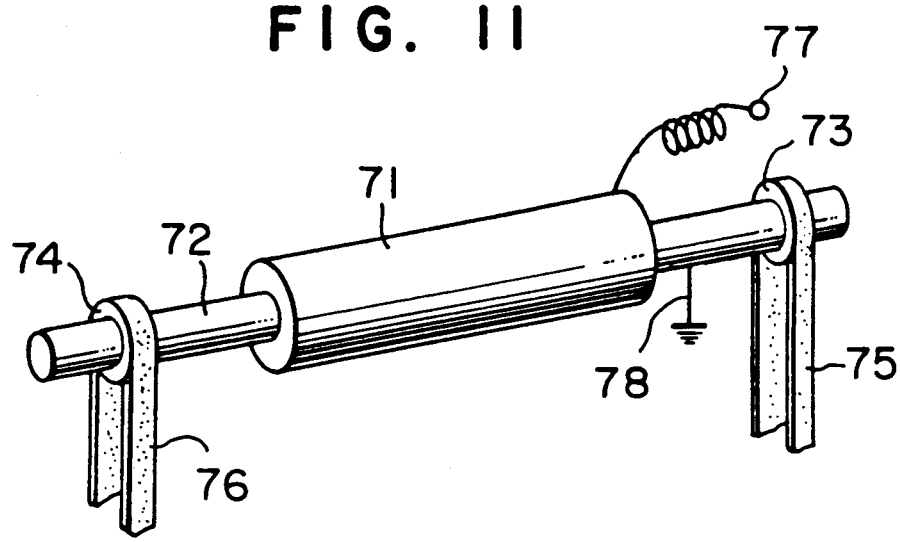
FIG. 11 is a view showing a pipe-shaped motor using a pipe type piezoelectric resolving resonator in accordance with an embodiment of the invention.

FIG. 11 illustrates a pipe type motor using a single-phase pipe type of piezoelectric revolving resonator in accordance with a still another embodiment of the invention. In Fig. 11, reference numeral 71 denotes a single-phase piezoelectric revolving resonator, numeral 72 denotes a metal shaft rotor, numerals 73 and 74 denote pulleys, numerals 75 and 76 denote belts, and numerals 77 and 78 denote lead wires.

Figure 13:
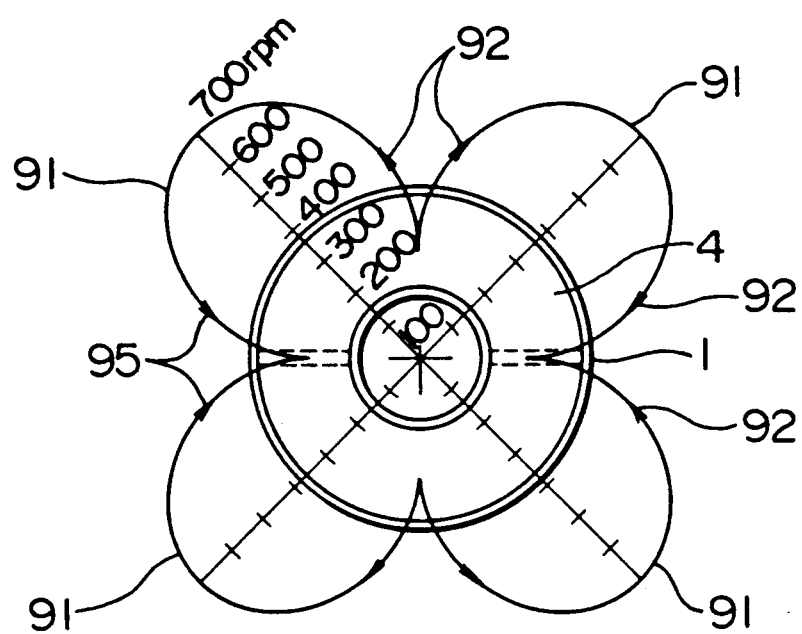
FIG. 13 shows experimental results of a direction-dependent rotation speed of a rotor.

The shaft 72 is passed through the single pipe type piezoelectric resolving resonator. Pulleys 73 and 74 are mounted on the shaft 72, and the shaft 72 is pulled toward load side pulleys (not shown) through belts 75 and 76. The fixed resonator 71 is brought into linear contact with the rotor shaft 72 to serving stabilize the revolving direction, revolving speed and torque. Although the direction of the revolution is limited to one direction, if the load side equipment is located to a position rotated by 90 degrees about the rotor shaft 72, the rotor 72 is reversely rotated and the revolution direction of the load is also reversed as same as the disk type motor illustrated in FIG. 13. The single-phase pipe type motor may be made as thin as about 3 mm in diameter and a drive circuit can be made single because of the single-phase drive. The motor may be driven by ICs and is of the energy saving type compatible with a battery.

Figure 12A:
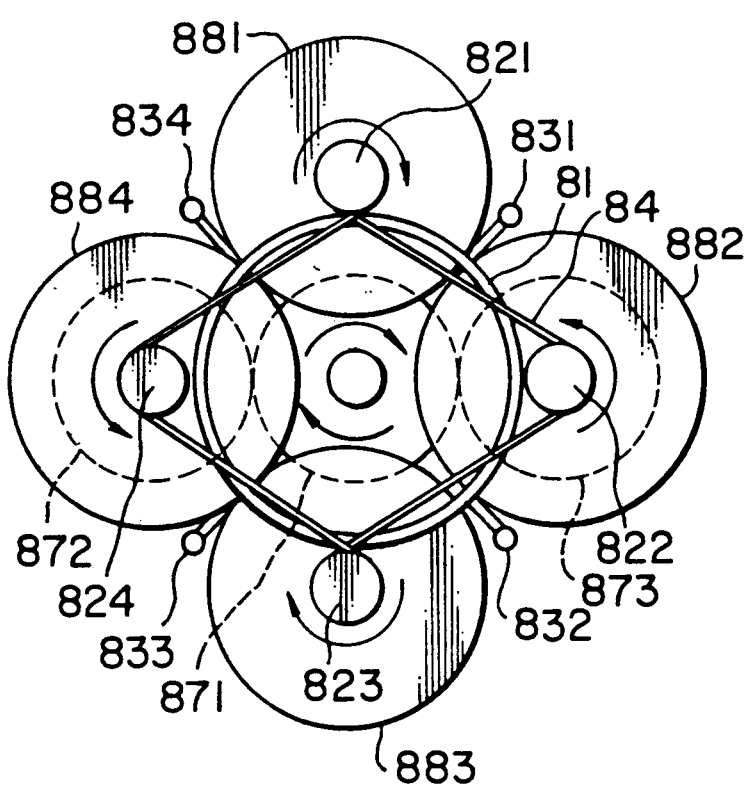
FIGS. 12A and 12B are a plan view and a side view, respectively, showing a multi-axis motor using a single-phase cylinder type piezoelectric revolving resonator according to still another embodiment of the invention.
Figure 12B:
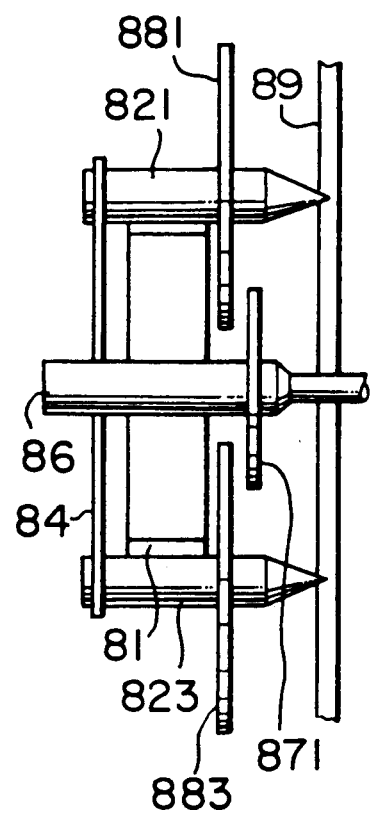

FIGS. 12A and 12B illustrate a multi-axis motor using a single-phase cylinder type piezoelectric revolving resonator according to a still another embodiment of the invention. In Figs. 12A and 12B, reference, numeral 81 denotes a single-phase cylinder type piezoelectric revolving resonator (stator), numerals 821 to 824 denote rotors, 831 to 834 denote stator support portions, numeral 84 denotes a belt, numeral 86 denotes an output shaft, numerals 871 to 873 denote laterally arranged gears, numerals 881 to 884 denote four directional gears, and numeral 89 denotes a base.

In the piezoelectric revolving resonator type motor, a plurality of rotors 821-824 arranged symmetrically and radially of the stator 81 are pressingly contacted toward the center of the stator 81, so that the stator 81 is not fixed but may be subjected to a strong contact pressure, thereby obtaining the strong rotational torque.

In the single-phase motor, the torque generated in the circumferential surface of the piezoelectric revolving resonator is reversed by every 90 degrees along the outer circumference thereof. Therefore, in the case where the four shafts 821-824 are brought into pressing contact with the stator 81 in the four directions, the confronted shafts, for example, 821 and 823 are revolved in the same direction, whereas the other shafts 822 and 824 are revolved in the opposite direction thereto. Accordingly, if gears are provided to the four shafts, respectively and combined with the adjacent one, the rotational torques are offset with each other, so that it was impossible to compose the outer torques in a simple manner unlike the two-phase four polarity motor, disadvantageously.

This disadvantage may be eliminated according to the embodiment shown in FIG. 12. According to this embodiment, it is possible to use the single-phase piezoelectric revolving resonator in the same manner as in the two-phase four-polar motor.

The four shafts 821, 822, 823 and 824 are arranged in four circumferentially different direction around the resonator stator 81, and the four gears 881 to 884 each mounted on the corresponding shaft are engaged with each other and well rotated. However, as the rotational direction of the output gear 871 of the output shaft 86 is opposite to the rotational direction of the two of the four gears 881 to 884, it is impossible to engage these gears without any modification to transfer all of the respective outputs or powers onto the output shaft 86. Accordingly, gears 872 and 873 which have the same diameter as that of the gear 871 ar mounted on and engaged with the two of the four gears (822 and 824) to thereby transfer all the rotational torques of the rotors 821 to 824 arranged in the four directions, onto the output shaft 86. In order to obtain a large torque, a strong contact pressure is required. Therefore, the belt 84 is laid around the four rotors 821 to 824 by reversing the winding directions for each rotor to thereby obtain the strong contact pressure by the belt 84. In this case, the supports of the rotors 821 to 824 by the base 89 are attained in the form of pivots or thrust bearings for serving as the support points of the contact pressure and for reducing the rotary shaft bearing friction. The arrangement ensures to increase the strong contact pressure by the belt. However, as the rotors are in contact with the stator and held substantially in an upright condition, there is no hindrance against the smooth engagement of the gears. In order to revolve the cylinder type piezoelectric revolving resonators, it is impossible to fix the outer circumferences because of the absence of nodal portions, so that it would be difficult to obtain the support points for the contact pressure. According to the arrangement of the embodiment, however, the supports for the contact pressure are attained by the four rotors per se, and excitation of revolution is not prevented. The offset of the rotations of the rotors are prevented by support members 831 to 834 of plastic material or the like, positioned at the insulative separator bands (56 in Fig. 10) and at portions along a direction perpendicular to the direction connecting the bands.

As described above, since a piezoelectric revolving resonator whose revolution can be excited by the single-phase AC voltage has been realized, it is possible to simplify the drive circuits for the resonator and the ultrasonic motor and to provide the motor more compact and lower in cost. In addition, since the cylinder, pipe or disk is polarized to have opposite polarity by half the circle thereof, it is possible to excite the first order resonant state, that is the lowest order of the resonant revolution, with single-phase AC voltage. The piezoelectric displacement in each semicircular portion can be kept uniform. Accordingly, for instance, in a "four-polar ultrasonic wave revolving resonator and the ultrasonic motor having the same" the direction of polarization was reversed by every semicircular portion and each semicircular portion was further divided by electrodes, so that the corresponding parts were excited by different phase independently by a quarter of the circle 90 degrees). Therefore, a higher order resonance mode at which the piezoelectric deformation is not kept constant was generated. As the order of the resonance mode is increased, Q-value of the resonator is decreased to increase an excitation loss. Thus, it is difficult to perform the piezoelectric excitation in the low order. On the contrary, in the single-phase piezoelectric revolving resonator, since the revolution state of the lowest order antisymmetric resonance mode may be excited by a low voltage of about 2 V, the motor having this resonator may be used with one chip drive/control source that is highly integrated, such as C-MOS or bipolar LSI. This means the remarkable advantage in a practical use of the ultrasonic motor. Thus, the ultrasonic motors according to the invention are expected to be widely used.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A piezoelectric revolving resonator comprising a piezoelectric ceramic element in the form of a disk, a cylinder or a pipe having only two areas of opposite polarization, said two areas being formed by dividing said disk, cylinder or pipe by its diameter, said piezoelectric ceramic element including a single electrode on each of opposite main surfaces thereof to form equipotential surfaces on said opposite main surfaces, such that a resonant condition, in which a center of mass of said piezoelectric element is revolved due to piezoelectric deformations thereof, can be excited by a single-phase alternating current voltage applied across said two single electrodes on said opposite main surfaces of said piezoelectric ceramic element.

2. A resonator assembly wherein a plurality of resonator elements according to claim 1 are laminated with each other so that said resonator elements are different in polarity from each other.

3. A resonator assembly wherein a plurality of resonator elements according to claim 1 are laminated with each other so that said resonator elements are different in polarity from each other, and further including a common ground electrode on opposite outer surfaces of said resonator assembly.

4. A single-phase ultrasonic motor comprising a piezoelectric revolving resonator element including a piezoelectric ceramic element in the form of a disk, a cylinder or a pipe having only two areas of opposite polarization, said two areas being formed by dividing said disk, cylinder or pipe by its diameter, said piezoelectric ceramic element including a single electrode on each of opposite main surfaces thereof to form equipotential surfaces on said opposite main surfaces creating a resonant condition whereby a center of mass of said piezoelectric element is revolved due to piezoelectric deformations thereof, excited by a single-phase alternating current voltage applied across said two single electrodes on said opposite main surfaces of said piezoelectric ceramic element.

5. The single-phase ultrasonic motor according to claim 4, wherein a plurality of said resonator elements are laminated with each other so that said resonator elements are different in polarity from each other.

6. The single-phase ultrasonic motor according to claim 4, wherein a plurality of said resonator elements are overlapped with each other so that sad resonator elements are different in polarity from each other and further including a common ground electrode on opposite outer surfaces of said resonator elements.

* * * * *